(12) United States Patent
Velasco

(10) Patent No.: US 12,307,113 B2
(45) Date of Patent: May 20, 2025

(54) ANALYZING AND DIVIDING CONTENT FOR EFFICIENT STORAGE AND RETRIEVAL

(71) Applicant: International Business Machines Corporation, Armonk, NY (US)

(72) Inventor: Marc Velasco, Orange, CA (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 17/653,467

(22) Filed: Mar. 4, 2022

(65) Prior Publication Data
US 2023/0280923 A1    Sep. 7, 2023

(51) Int. Cl.
*G06F 7/00* (2006.01)
*G06F 3/06* (2006.01)
*G06F 16/11* (2019.01)
*G06F 16/958* (2019.01)

(52) U.S. Cl.
CPC .......... *G06F 3/0643* (2013.01); *G06F 3/0607* (2013.01); *G06F 3/0673* (2013.01); *G06F 16/116* (2019.01); *G06F 16/958* (2019.01); *G06F 16/986* (2019.01)

(58) Field of Classification Search
CPC .... G06F 3/0643; G06F 3/0607; G06F 3/0673; G06F 16/116; G06F 16/958; G06F 16/986; G06F 16/93; G06F 40/123; G06F 40/186; G06F 40/194; H04L 67/1097
USPC ......... 707/723, 737, 754, E17.046; 715/209, 715/221, 243, 426, 253, 255
See application file for complete search history.

(56) References Cited

U.S. PATENT DOCUMENTS

| | | | |
|---|---|---|---|
| 6,976,031 B1 | 12/2005 | Toupal | |
| 7,472,343 B2 | 12/2008 | Vasey | |
| 8,542,593 B1* | 9/2013 | Kumar | H04L 1/0078 713/168 |
| 8,587,613 B2 | 11/2013 | Wang | |
| 9,223,773 B2 | 12/2015 | Isaacson | |
| 9,277,234 B1* | 3/2016 | Whillock | H03M 7/30 |
| 9,773,039 B2* | 9/2017 | Knight | G06F 16/325 |
| 9,946,865 B2 | 4/2018 | Krawczyk | |
| 2003/0079184 A1* | 4/2003 | Berger | G06T 9/001 715/255 |
| 2011/0302166 A1* | 12/2011 | Moriya | G06F 16/3331 707/E17.046 |
| 2022/0036063 A1* | 2/2022 | Bhuyan | G06V 30/416 |

* cited by examiner

*Primary Examiner* — Md I Uddin
(74) *Attorney, Agent, or Firm* — Nicholas A. Welling

(57) ABSTRACT

In an approach to analyzing and dividing content for efficient storage and retrieval, one or more computer processors receive a first digital content from a user. One or more computer processors divide the first digital content into a first unique portion and a first common portion. One or more computer processors analyze the first common portion to determine whether the first common portion matches a previously stored template. One or more computer processors determine the first common portion does not match a previously stored template. In response to determining the first common portion does not match a previously stored template one or more computer processors store the first common portion as a new template. One or more computer processors distribute the new template to the user.

13 Claims, 3 Drawing Sheets

ANALYZING AND DIVIDING CONTENT FOR EFFICIENT STORAGE AND RETRIEVAL

BACKGROUND OF THE INVENTION

The present invention relates generally to the field of content management systems (CMSs), and more particularly to analyzing and dividing content for efficient storage and retrieval.

Content management systems (CMSs) are used in collaborative environments, such as workplaces or various types of organizations, to manage data and workflows. In a CMS, data, i.e., content, can be defined as nearly anything: documents, movies, pictures, phone numbers, scientific data, and so forth. CMSs are frequently used for storing, controlling, revising, semantically enriching, and publishing documentation. CMSs can allow for a large number of people to contribute to and share stored data; control access to data, based on user roles (defining which information users or user groups can view, edit, publish, etc.); aid in easy storage and retrieval of data; reduce repetitive duplicate input; improve the ease of report writing; and improve communication between users.

Typically, CMSs are implemented on various types of computer systems and include data stored in databases, along with analytical processing tools that can process the data to derive valuable results for the organization. Most CMSs are built on a client-server model, where each client initiates requests and transactions to a central server or a server in a farm of like configured servers hosting a managing layer of software for content.

In computing, a cache is a hardware or software component that stores data so that future requests for that data can be served faster than reading from a slower data store. The data stored in a cache may be the result of an earlier computation or a copy of data stored elsewhere. Thus, the more requests that can be served from the cache, the faster the system performs. To be cost-effective and to enable efficient use of data, caches must be relatively small.

SUMMARY

Embodiments of the present invention disclose a computer-implemented method, a computer program product, and a system for analyzing and dividing content for efficient storage and retrieval. The computer-implemented method may include one or more computer processors receiving a first digital content from a user. One or more computer processors divide the first digital content into a first unique portion and a first common portion. One or more computer processors analyze the first common portion to determine whether the first common portion matches a previously stored template. One or more computer processors determine the first common portion does not match a previously stored template. In response to determining the first common portion does not match a previously stored template one or more computer processors store the first common portion as a new template. One or more computer processors distribute the new template to the user.

DETAILED DESCRIPTION

Digital content, such as documents, digital images, and videos, can be very large and complex to store. Techniques to retrieve digital content typically involve caching, putting an importance on building intelligent and efficient caching strategies. Caching creates a secondary, faster storage, but, depending on how caching is implemented, it may create significant memory consumption. Therefore, serving digital content for users is a balancing act of storage, memory, response time, and time to transmit content for storage.

Embodiments of the present invention recognize that improvements to transmitting content for storage and the space required for storage may be made by providing a system that dynamically divides, or separates, content into a common portion, which occupies less storage, and a unique portion. Embodiments of the present invention also recognize that efficiency may be gained by combining the common portion and the unique portion of the content at content retrieval and/or usage time. Implementation of embodiments of the invention may take a variety of forms, and exemplary implementation details are discussed subsequently with reference to the Figures.

Figure 1:
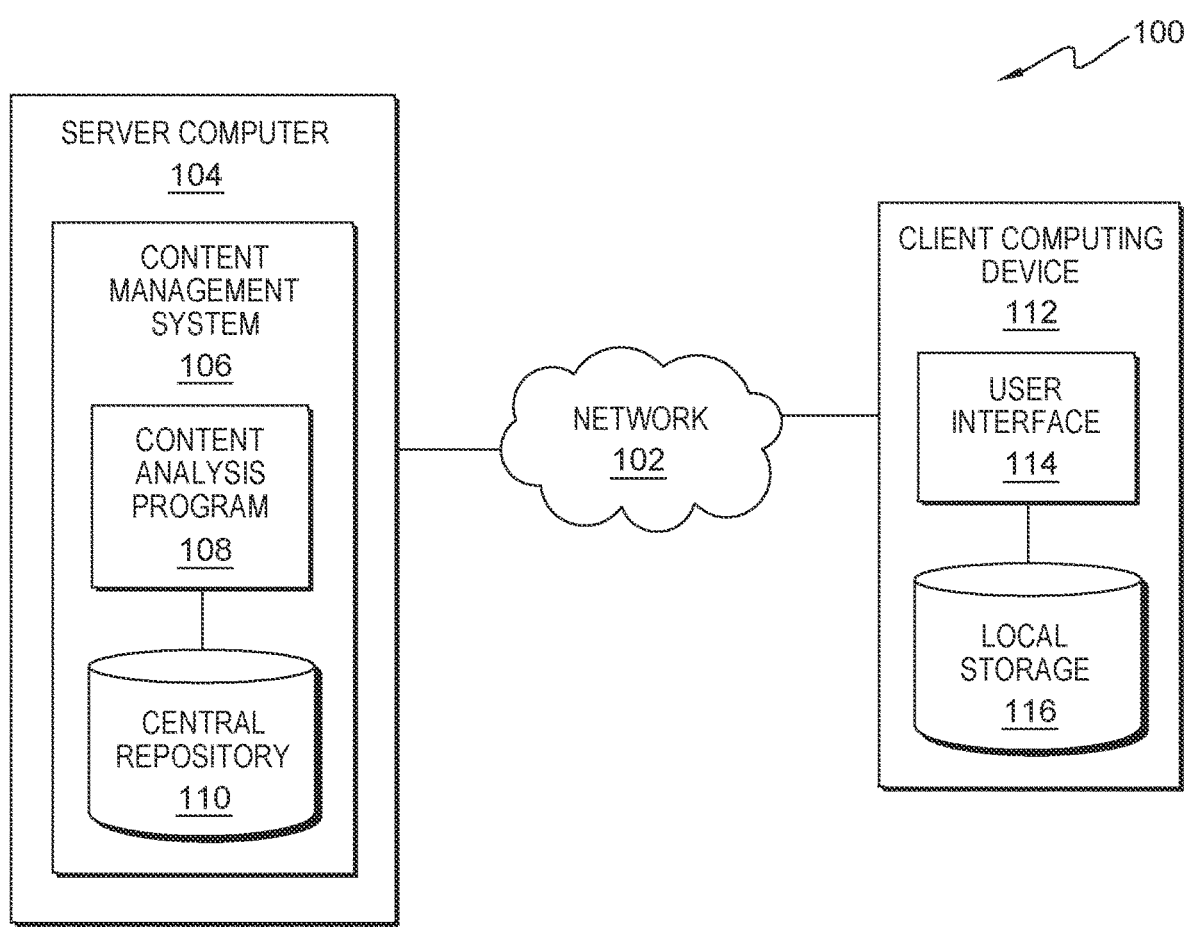
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104 and client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes content management system (CMS) 106, content analysis program 108, and central repository 110. Server computer 104 may include internal and external hardware components, as depicted and described in further detail with respect to FIG. 3.

CMS 106 is one of a plurality of software systems used to manage the creation and modification of digital content, as would be recognized by a person of skill in the art. CMS 106 may include features such as intuitive indexing, format management, revision control, and publishing functionality. CMS 106 includes content analysis program 108 and central repository 110.

Content analysis program 108 analyzes content and separates the content into a common portion and a unique portion, where the common portion is common among many types of content and becomes a template that is stored once. Content analysis program 108 stores the two portions separately, such that the two portions can be combined later, when requested by a user. Content analysis program 108 receives content. Content analysis program 108 divides the content into a unique portion and a common portion. Content analysis program 108 analyzes the common portion for a match with existing templates. If content analysis program 108 determines that the common portion does not match an existing template, then content analysis program 108 stores the common portion as a new template. Content analysis program 108 distributes the new template to a user. Content analysis program 108 receives a request for stored content from the user. Content analysis program 108 determines whether there is a corresponding template in local storage 116 of client computing device 112. If content analysis program 108 determines there is not a corresponding template, then content analysis program 108 uploads both the template and the unique portion of the content to client computing device 112. If content analysis program 108 determines there is a corresponding template, then content analysis program 108 uploads the unique portion of the content to client computing device 112. In the depicted embodiment, content analysis program 108 is a component of CMS 106. In another embodiment, content analysis program 108 resides elsewhere within distributed data processing environment 100 provided content analysis program 108 has access to CMS 106. Content analysis program 108 is depicted and described in further detail with respect to FIG. 2.

Central repository 110 stores information used by and generated by CMS 106 and/or content analysis program 108. In the depicted embodiment, central repository 110 resides on server computer 104. In another embodiment, central repository 110 may reside elsewhere within distributed data processing environment 100, provided that CMS 106 and content analysis program 108 have access to central repository 110. In an embodiment, central repository 110 is database, i.e., an organized collection of data. Central repository 110 can be implemented with any type of storage device capable of storing data and configuration files that can be accessed and utilized by CMS 106 and content analysis program 108, such as a database server, a hard disk drive, or a flash memory. Central repository 110 stores content uploaded to CMS 106 by users and/or programs. Central repository 110 also stores one or more templates of common content.

The present invention may contain various accessible data sources, such as central repository 110 and local storage 116, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Content analysis program 108 enables the authorized and secure processing of personal data. Content analysis program 108 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Content analysis program 108 provides information regarding personal data and the nature (e.g., type, scope, purpose, duration, etc.) of the processing. Content analysis program 108 provides the user with copies of stored personal data. Content analysis program 108 allows the correction or completion of incorrect or incomplete personal data. Content analysis program 108 allows the immediate deletion of personal data.

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of user interface 114.

User interface 114 provides an interface between a user of client computing device 112 and CMS 106 and/or content analysis program 108, on server computer 104. In one embodiment, user interface 114 is mobile application software. Mobile application software, or an "app," is a computer program designed to run on smart phones, tablet computers and other mobile devices. In one embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 114 enables the user of client computing device 112 to request and receive content from CMS 106. User interface 114 also enables a user of client computing device 112 to download and/or sync one or more templates from central repository 110 as the templates become available. In addition, user interface 114 enables the user of client computing device 112 to upload a locally created template to central repository 110.

Local storage 116 stores information used by, requested by, and/or generated by the user of client computing device 112. In the depicted embodiment, local storage 116 resides on client computing device 112. In another embodiment, local storage 116 may reside elsewhere within distributed data processing environment 100, provided that the user of client computing device 112 has access to local storage 116. In an embodiment, local storage 116 is database, i.e., an organized collection of data. Local storage 116 can be implemented with any type of storage device capable of storing data and configuration files that can be accessed and utilized by CMS 106 and content analysis program 108, such as a database server, a hard disk drive, or a flash memory. Local storage 116 stores one or more templates downloaded from central repository 110. Local storage 116 also stores any content and/or templates created by the user of client computing device 112.

Figure 2:
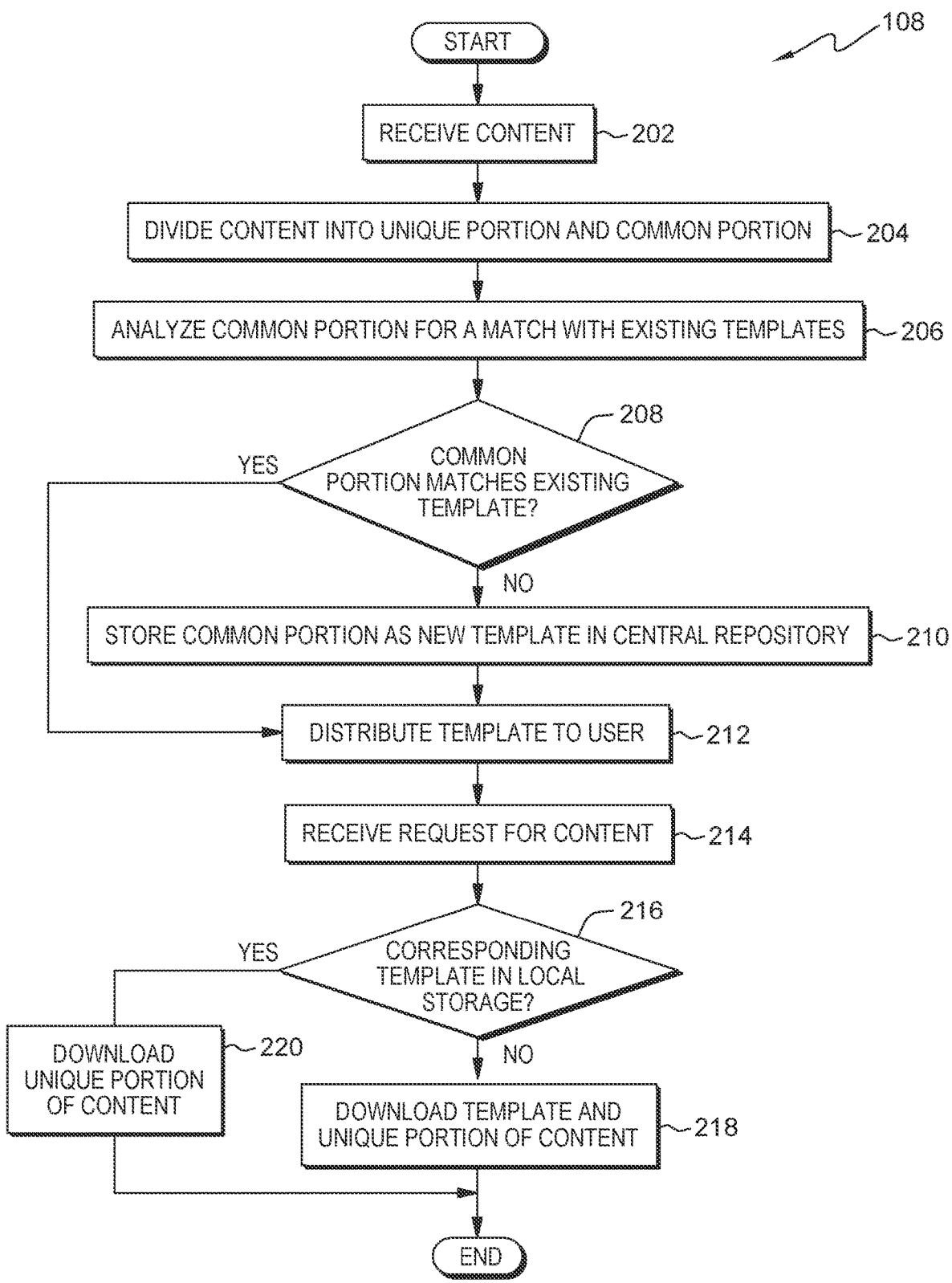
FIG. 2 is a flowchart depicting operational steps of a content analysis program, on a server computer within the distributed data processing environment of FIG. 1, for analyzing and dividing content for efficient storage and retrieval, in accordance with an embodiment of the present invention.

FIG. 2 is a flowchart depicting operational steps of content analysis program 108, on server computer 104 within distributed data processing environment 100 of FIG. 1, for analyzing and dividing content for efficient storage and retrieval, in accordance with an embodiment of the present invention.

Content analysis program 108 receives content (step 202). In an embodiment, as users of CMS 106, such as the user of client computing device 112, create content, CMS 106 ingests the content, and when CMS 106 subsequently pushes the ingested content to content analysis program 108, then content analysis program 108 receives the content. In another embodiment, new content is created programmatically. For example, a batch process may be scanning and ingesting content as an automated process or ingestion service. In an embodiment, upon creation and/or ingestion of new content, CMS 106 stores the content in central repository 110, and content analysis program 108 retrieves the content from central repository 110. In another embodiment, content analysis program 108 retrieves the content from CMS 106 directly, via a queue of content, and/or via any other known method for content retrieval. In an embodiment, the content received from the user of client computing device 112 is a template.

Content analysis program 108 divides the content into a unique portion and a common portion (step 204). In an embodiment, content analysis program 108 divides the content into two portions: a unique portion and a common portion. The common portion of the content represents the basic building blocks of the content that include generic and/or static information that is similar in many different types of content. The common portion acts as a template of typical content. For example, one or more of a set of forms or other structured content may be templates. The unique portion of the content is more complex than the common portion and differs for each unit of content created by a user. For example, if the common portion is a mortgage form, then the unique portion is the data and/or textual information that a user enters into the form. Content analysis program 108 separates the unique portion of the content from the common portion of the content. In an embodiment, content analysis program 108 uses optical character recognition (OCR) to extract the unique portion from the common portion of the content. In an embodiment, content analysis program 108 stores the unique portion of the content in central repository 110. In an embodiment, content analysis program 108 associates one or more of a name, a tag, metadata, etc. with the unique portion of the content such that the unique portion has an identifying feature that can be used for later retrieval. In an embodiment where the received content is a template with no unique portion, content analysis program 108 recognizes the lack of a unique portion and does not perform step 204.

Content analysis program 108 analyzes the common portion for a match with existing templates (step 206). In an embodiment, content analysis program 108 compares the common portion of the newly received content with one or more templates that are currently stored in central repository 110 to determine whether an existing template matches the common content. For example, if the common portion is a mortgage form, then content analysis program 108 compares the mortgage form to one or more other forms in central repository 110.

Content analysis program 108 determines whether the common portion matches an existing template (decision block 208). In an embodiment, based on the analysis of step 206, content analysis program 108 determines whether the common portion matches a template that currently exists in central repository 110.

If content analysis program 108 determines that the common portion does not match an existing template ("no" branch, decision block 208), then content analysis program 108 stores the common portion as a new template (step 210). In an embodiment, content analysis program 108 stores the common portion of the newly received content as a new template in central repository 110. Once stored, the new template is available for subsequent use during content retrieval. In an embodiment, content analysis program 108 creates a template identification (ID) reference value for the new template. Continuing the previous example, content analysis program 108 may create a template ID called "mortgage form 1" for the mortgage form. In an embodiment, content analysis program 108 stores the template ID as metadata in association with the unique portion of the newly received content in central repository 110, such that when CMS 106 retrieves the content, CMS 106 can easily and directly retrieve the exact template associated with the unique portion. In an embodiment, content analysis program 108 determines that although a matching template does not exist, a template that matches at least a threshold similarity criteria exists. In the embodiment, content analysis program 108 updates the existing template to include features from the common portion of the newly received content that are not currently in the existing template. In an embodiment, content analysis program 108 stores the new template in a portion of central repository 110 that is separate from where content analysis program 108 stores the unique portion of content. For example, content analysis program 108 may store the unique portion of the content in a standard caching mechanism, which consumes less space than storing the entire document. Content analysis program 108 may store a template in cache as well, however the new template will occupy significantly less space than the unique portion of the content, as there can be one template corresponding to multiple instances of unique content.

In an embodiment, content analysis program 108 analyzes templates stored in central repository 110 to determine whether one or more templates need to be updated and/or merged. In the embodiment, the analysis may be based on a retrieval rate of content associated with the one or more templates and/or newly created content. For example, as more similar content is stored in central repository 110, content analysis program 108 can adjust common templates accordingly. In an embodiment, content analysis program 108 determines whether content associated with a template has not been requested for greater than a pre-defined threshold period of time, and, if so, then content analysis program 108 deletes the template from central repository 110.

Responsive to storing a new template, or if content analysis program 108 determines that the common portion does match an existing template ("yes" branch, decision block 208), then content analysis program 108 distributes the template to a user (step 212). In an embodiment, content analysis program 108 downloads the new template or the matching existing template, via user interface 114, to client computing device 112 for storage in local storage 116. By downloading the template to local storage 116, content analysis program 108 pre-positions the data for later use, thereby enabling the user to avoid downloading the template again for a similar document, saving time and bandwidth. In one embodiment, content analysis program 108 downloads the template to local storage 116 as soon as content analysis program 108 generates a new template. In another embodiment, content analysis program 108 waits until a convenient time to download the template to local storage 116. For example, content analysis program 108 may determine that client computing device 112 is not in use, and then downloads the template. In yet another embodiment, content analysis program 108 downloads any new templates generated during a pre-defined duration of time. For example, content analysis program 108 may download new templates to client computing device 112 once a week.

Content analysis program 108 receives a request for stored content from the user (step 214). In an embodiment, content analysis program 108 receives a request from the user of client computing device 112, via user interface 114, to retrieve content. In an embodiment, CMS 106 receives the request for stored content, and when CMS 106 subsequently pushes the request to content analysis program 108, then content analysis program 108 receives the request. In an embodiment, content analysis program 108 receives the request for stored content after a period of time has passed since content analysis program 108 received new content in step 202. In an embodiment, the request for stored content is for content other than the content received in step 202.

Content analysis program 108 determines whether there is a corresponding template in local storage 116 of client computing device 112 (decision block 216). In an embodiment, content analysis program 108 analyzes the requested content in central repository 110 to determine whether content analysis program 108 has previously divided the content into a unique portion and a common portion of content, and, if so, then content analysis program 108 determines whether a template corresponding to the common portion of the content was previously downloaded to local storage 116, as described with respect to step 212.

If content analysis program 108 determines there is not a corresponding template ("no" branch, decision block 216), then content analysis program 108 downloads both the template and the unique portion of the content (step 218). In an embodiment, content analysis program 108 responds to the request for content by downloading both the unique portion and the common portion of the content from central repository 110 to local storage 116 in response to determining a template for the common portion has not been previously stored in local storage 116. In an embodiment, content analysis program 108 combines the unique portion and the common portion of the content to transform the two portions into the complex content that was previously uploaded to central repository 110. In an embodiment, content analysis program 108 notifies the user, via user interface 114, that a template exists for the requested content and asks if the user would like to store the template for future usage. In the embodiment, if the user responds positively, then content analysis program 108 downloads the template to local storage 116, as described with respect to step 212.

If content analysis program 108 determines there is a corresponding template ("yes" branch, decision block 216), then content analysis program 108 downloads the unique portion of the content (step 220). In an embodiment, content analysis program 108 responds to the request for content by downloading only the unique portion of the content from central repository 110 to local storage 116 in response to determining a template for the common portion is stored in local storage 116. Since the template already exists on client computing device 112, when a user views the content, content analysis program 108 uses the template, which may be a starter form or document, to render the unique data associated with that content. Further, content analysis program 108 does not redownload a common template of content again for a similar document, as content analysis program 108 downloads just the net new parts of the content, saving time and bandwidth by not downloading the whole document, and enabling dynamic, client specific, optimization of content retrieval. In an embodiment, responsive to downloading the unique portion of the content, content analysis program 108 combines the unique portion of the content with the stored template to transform the two portions into the complex content that was previously uploaded to central repository 110.

In an embodiment, content analysis program 108 is configurable, such that, upon content upload to CMS 106, content analysis program 108 performs the separation of content as described with respect to step 204, or content analysis program 108 can, instead, pause the upload to first, force a download of a corresponding template, and then, force the upload of only the unique portion of the content. In an embodiment, the configuration of content analysis program 108 is determined by whether requests for content exceed a pre-defined threshold. For example, if a number of requests, or rate of requests, exceeds a pre-defined threshold, then content analysis program 108 is configured to enable using templates to preserve bandwidth. In another embodiment, the configuration of content analysis program 108 is determined by which method is more advantageous from a transmission and/or quality of service perspective.

Figure 3:
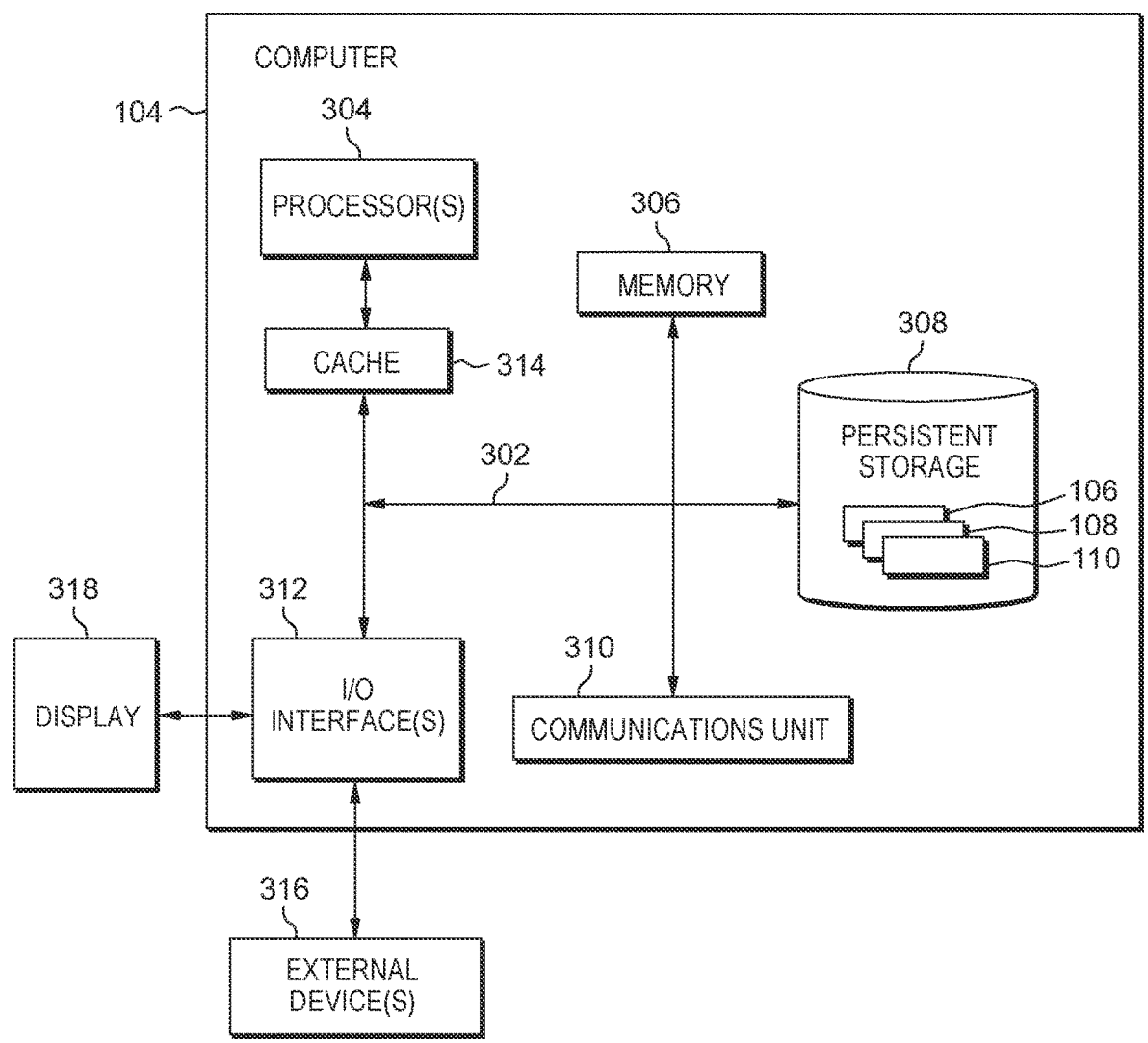
FIG. 3 depicts a block diagram of components of the server computer executing the content analysis program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., content management system (CMS) 106, content analysis program 108, and central repository 110, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 112. In these examples, communications unit 310 includes one or more network interface cards. Communications unit 310 may provide communications through the use of either or both physical and wireless communications links. CMS 106, content analysis program 108, central repository 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., CMS 106, content analysis program 108, and central repository 110 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, a first digital content from a user, wherein the digital data include personal data and allowing the user to opt in or opt out of processing personal data;
   dividing, by one or more computer processors, the first digital content into a first unique portion and a first common portion using optical character recognition (OCR) to extract the first unique portion from the first common portion;
   analyzing, by one or more computer processors, the first common portion to determine whether the first common portion matches a previously stored template;
   determining, by one or more computer processors, the first common portion does not match the previously stored template;
   responsive to determining the first common portion does not match the previously stored template, storing, by one or more computer processors, the first common portion as a new template; and
   distributing, by one or more computer processors, the new template to the user;
   creating, by one or more computer processors, a template identification (ID) reference value for the new template; and
   storing, by one or more computer processors, the template ID reference value as metadata in association with the first unique portion;
   analyzing, by one or more computer processors, a retrieval rate of one or more previously stored templates; and
   updating, by one or more computer processors, at least one of the one or more previously stored templates based on the retrieval rate, wherein updating includes if the rate of requests exceeds a pre-defined threshold, then content analysis program is configured to enable using templates to preserve bandwidth.

2. The computer-implemented method of claim 1, further comprising:

determining, by one or more computer processors, the first common portion does match the previously stored template; and responsive to determining the first common portion does match the previously stored template, distributing, by one or more computer processors, the previously stored template to the user.

3. The computer-implemented method of claim 1, further comprising:

receiving, by one or more computer processors, a request for a second digital content from the user, wherein the second digital content includes a second unique portion and a second common portion;

determining, by one or more computer processors, a template corresponding to the second common portion of the second digital content exists in a storage of a computing device of the user; and responsive to determining the template corresponding to the second common portion of the second digital content exists in storage of a computing device of the user, downloading, by one or more computer processors, the second unique portion of the second digital content to the computing device of the user.

4. The computer-implemented method of claim 3, further comprising:

determining, by one or more computer processors, the template corresponding to the second common portion of the second digital content does not exist in the storage of the computing device of the user; and responsive to determining the template corresponding to the second common portion of the second digital content does not exist in storage of a computing device of the user, downloading, by one or more computer processors, the second unique portion of the second digital content and the template corresponding to the second common portion of the second digital content to the computing device of the user.

5. The computer-implemented method of claim 1, wherein the first common portion is a form that includes static information.

6. A computer program product comprising:

one or more computer readable storage media and program instructions collectively stored on the one or more computer readable storage media, the stored program instructions comprising:

program instructions to receive a first digital content from a user, wherein the digital data include personal data and allowing the user to opt in or opt out of processing personal data;

program instructions to divide the first digital content into a first unique portion and a first common portion using optical character recognition (OCR) to extract the first unique portion from the first common portion;

program instructions to analyze the first common portion to determine whether the first common portion matches a previously stored template;

program instructions to determine the first common portion does not match the previously stored template;

responsive to determining the first common portion does not match the previously stored template, program instructions to store the first common portion as a new template; and program instructions to distribute the new template to the user;

program instructions to create a template identification (ID) reference value for the new template; and program instructions to store the template ID reference value as metadata in association with the first unique portion;

program instructions to analyze a retrieval rate of one or more previously stored templates; and program instructions to update at least one of the one or more previously stored templates based on the retrieval rate, wherein updating includes if the rate of requests exceeds a pre-defined threshold, then content analysis program is configured to enable using templates to preserve bandwidth.

7. The computer program product of claim 6, the stored program instructions further comprising:

program instructions to determine the first common portion does match the previously stored template; and responsive to determining the first common portion does match the previously stored template, program instructions to distribute the previously stored template to the user.

8. The computer program product of claim 6, the stored program instructions further comprising:

program instructions to receive a request for a second digital content from the user, wherein the second digital content includes a second unique portion and a second common portion;

program instructions to determine a template corresponding to the second common portion of the second digital content exists in a storage of a computing device of the user; and responsive to determining the template corresponding to the second common portion of the second digital content exists in storage of a computing device of the user, program instructions to download the second unique portion of the second digital content to the computing device of the user.

9. The computer program product of claim 8, the stored program instructions further comprising:

program instructions to determine the template corresponding to the second common portion of the second digital content does not exist in the storage of the computing device of the user; and responsive to determining the template corresponding to the second common portion of the second digital content does not exist in storage of a computing device of the user, program instructions to download the second unique portion of the second digital content and the template corresponding to the second common portion of the second digital content to the computing device of the user.

10. A computer system comprising:

one or more computer processors;

one or more computer readable storage media;

program instructions collectively stored on the one or more computer readable storage media for execution by at least one of the one or more computer processors, the stored program instructions comprising:

program instructions to receive a first digital content from a user, wherein the digital data include personal data and allowing the user to opt in or opt out of processing personal data;

program instructions to divide the first digital content into a first unique portion and a first common portion using optical character recognition (OCR) to extract the first unique portion from the first common portion;

program instructions to analyze the first common portion to determine whether the first common portion matches a previously stored template;

program instructions to determine the first common portion does not match the previously stored template;
responsive to determining the first common portion does not match the previously stored template, program instructions to store the first common portion as a new template; and
program instructions to distribute the new template to the user, program instructions to create a template identification (ID) reference value for the new template; and
program instructions to store the template ID reference value as metadata in association with the first unique portion;
program instructions to analyze a retrieval rate of one or more previously stored templates; and
program instructions to update at least one of the one or more previously stored templates based on the retrieval rate, wherein updating includes if the rate of requests exceeds a pre-defined threshold, then content analysis program is configured to enable using templates to preserve bandwidth.

11. The computer system of claim 10, the stored program instructions further comprising:
program instructions to determine the first common portion does match the previously stored template; and
responsive to determining the first common portion does match the previously stored template, program instructions to distribute the previously stored template to the user.

12. The computer system of claim 10, the stored program instructions further comprising:
program instructions to receive a request for a second digital content from the user, wherein the second digital content includes a second unique portion and a second common portion;
program instructions to determine a template corresponding to the second common portion of the second digital content exists in a storage of a computing device of the user; and
responsive to determining the template corresponding to the second common portion of the second digital content exists in storage of a computing device of the user, program instructions to download the second unique portion of the second digital content to the computing device of the user.

13. The computer system of claim 12, the stored program instructions further comprising:
program instructions to determine the template corresponding to the second common portion of the second digital content does not exist in the storage of the computing device of the user; and
responsive to determining the template corresponding to the second common portion of the second digital content does not exist in storage of a computing device of the user, program instructions to download the second unique portion of the second digital content and the template corresponding to the second common portion of the second digital content to the computing device of the user.

* * * * *